Jan. 19, 1926.

E. E. COTHRAN 1,569,850

PNEUMATIC AUTOMOBILE SPRING

Filed Sept. 14, 1921

INVENTOR

Edward Everett Cothran

Patented Jan. 19, 1926.

1,569,850

UNITED STATES PATENT OFFICE.

EDWARD EVERETT COTHRAN, OF WRIGHT, CALIFORNIA.

PNEUMATIC AUTOMOBILE SPRING.

Application filed September 14, 1921. Serial No. 500,538.

*To all whom it may concern:*

Be it known that I, EDWARD EVERETT COTHRAN, a citizen of the United States, residing at Wright, in the county of Santa Clara and State of California, have invented a new and useful Pneumatic Automobile Spring, of which the following is a specification.

My invention relates to improvements in automobile springs in which compressed air in rubber chambers and vulcanized cloth fabric and rubber in conjunction with metal plates, bolts, ball-bearings and oil cups operate as pneumatic springs for automobiles; and the objects of my improvement are, first, to provide pneumatic springs in place of the present steel springs between the frame of the chassis and axles of the automobile; second, to reduce the vibrations and eliminate the jolts and shocks of the automobile under all working conditions; third, to render pneumatic tires upon pleasure cars unnecessary and permit in their stead the use of solid rubber and metallic tires; fourth, to allow chains or other non-skidding devices to be used upon the wheels without causing the automobile to ride harder, and fifth, to increase the economy, comfort and safety of such machine.

I attain these objects by the mechanism illustrated in the accompanying drawing, in which—

Figure 1:
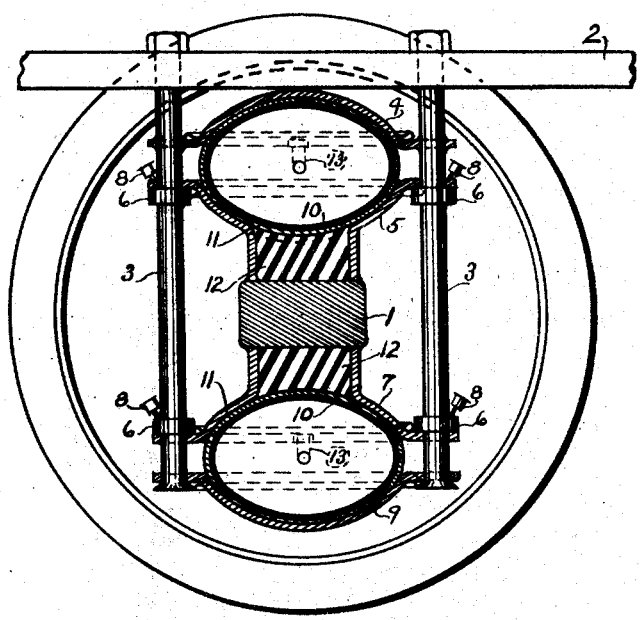
Figure 3:
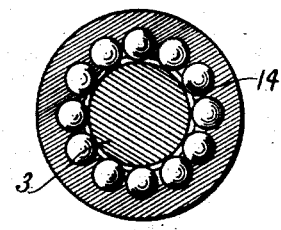
Figure 2:
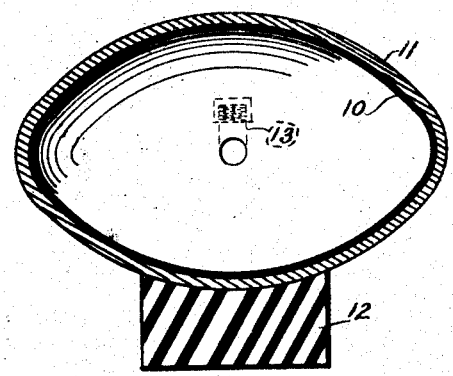

Figure 1 is a view which, looking forward from the right rear axle, shows such pneumatic spring as it appears in its proper connection with the axle and chassis frame of the automobile, together with the outline of a tire; Fig. 2 is a separate view of one of the two similar compressed-air chambers, outer cases, lugs and air-valves that constitute the purely pneumatic elements of said spring; and Fig. 3 is a view of one of the similar ball-bearings and their annular containing grooves with the cross-section of one of the bolts against which said ball-bearings work in said mechanism; four such bearings being required for each pneumatic spring.

Similar numerals refer to similar parts throughout the several views.

In Figure 1, 1 is the stationary housing of the axle and which for convenience is hereinafter designated as the axle of an automobile, or simply as the axle, 2 is the frame of the chassis, 3 and 3 are similar round steel bolts vertically set and immovably fixed in the frame of the chassis and extending downward, one in front, the other behind the axle, 4 is a concave metallic plate, shaped somewhat like the upper half of an ellipse, with a round hole at each end through which said bolts pass and extend and at which points said plate is rigidly affixed to said bolts by nuts or other suitable means; 5 is a metallic plate, shaped somewhat like the lower half of an ellipse with a square depression therein immediately next the axle to which axle, said plate at the bottom of said square depression in said plate, is rigidly affixed by welding or bolting said plate to the top of said axle; said plate 5 having at each end ball-bearings through which bearings said bolts respectively pass and extend downward in front and behind the axle; 6, 6, 6 and 6 are ball-bearings; 7 is a metallic plate, shaped somewhat like the upper half of an ellipse, with a square elevation therein immediately next the axle to which axle, said plate at the top of said square elevation in said plate, is rigidly affixed by welding or bolting said plate to the under surface of said axle; said plate 7 having at each end ball-bearings through which bearings said bolts respectively pass and extend downward in front and behind the axle; 8, 8, 8 and 8 are oil or grease cups enclosing said bearings for the purpose of lubrication; 9 is a metallic plate, shaped somewhat like the lower half of an ellipse, with a hole at each end through which said bolts respectively pass and at which points said plate is rigidly affixed by nuts or other suitable means; 10 and 10 are seamless rubber chambers, elliptical in shape, 11 and 11 are seamless outer cases made of layers of cloth fabric covered with rubber and vulcanized together to form one piece, also elliptical in shape, and compactly surrounding said rubber chambers, 10 and 10, respectively; 12 and 12 are square solid rubber lugs vulcanized to and made integral with the exterior surfaces of said respective outer cases, one of the said lugs being designed to tightly fit in the square depression in plate 5, the other of said lugs being designed to tightly fit in the square elevation in plate 7; the said lugs 12 and 12, being vulcanized to the respective outer cases 11 and 11, and fitting tightly in the square depression in plate 5 and in the square elevation in plate 7, respectively, are for the purpose of preventing the said outer cases from turning or shifting in position during the operation of the automobile, and of always keeping the air-valves 13 and 13 in the places shown in Fig. 1. 13 and 13 are air-valves seated in said respective rubber chambers and extending through said outer cases to the open air whereby said rubber chambers are inflated with compressed air; said plates 4 and 5 snugly embrace, so as to securely hold in position, part of the exterior surface of one of said outer cases containing said rubber chambers, while the square depression in plate 5 tightly fits the square lug vulcanized to said outer case; said plates 7 and 9 snugly embrace, so as to securely hold in position, part of the exterior surface of another of said outer cases containing said rubber chambers, while the square elevation in plate 7 tightly fits the square lug vulcanized to said outer case.

The plates 4 and 9, being rigidly affixed to the bolts 3 and 3, the latter rigidly affixed to the frame of the chassis 2, can only move up and down with the chassis; and the plates 5 and 7, being rigidly affixed to the axle, and having ball-bearings, are free to move up and down with every upward and downward motion of the axle and wheels of the automobile, while said outer cases and rubber air-chambers are synchronously and elastically expanded or compressed.

The rubber chambers 10 and 10 and their outer cases 11 and 11 must always be so that, under their working air pressure, they possess greater external surface dimensions than the internal surface dimensions of said metallic plates.

Thus, when 10 and 10 are inflated with compressed air, the plates 4 and 5 or the plates 7 and 9 cannot come in physical contact but are kept well apart under all conditions.

In the average pleasure automobile, the upper and lower metallic plates may embrace two-thirds of the surface of an outer case, leaving one-third the surface around the center of the elliptical surface of the case exposed to the air and capable of yielding and expanding elastically when the automobile is subjected to vibration, jolts and shocks.

Preferably, however, the plates should be so curved that the elliptical outer cases and air chambers, when under the pressure of normal working inflation, rest against the interior surface of the upper and lower plates for only one-half the distance from the vertices at the axis minor to the principal vertices at the axis major of the said ellipse.

The plates thus securely hold in position said outer cases and air chambers and still permit them to yield, compress and expand elastically under increased and varying weights or the sudden pressure produced by vibrations, jolts and shocks.

The edges of the plates must also be made with a small outward curve to prevent the possibility of abrasion of the outer cases and air chambers when the automobile is subjected to great and unusual shocks. While I prefer outer cases and air chambers elliptical in shape with correspondingly formed plates, of the above relative dimensions, I do not wish the invention to be confined to such shapes and dimensions for the reason that it will work with spherical, cylindrical, square and other shapes and with different relative dimensions.

The foregoing description of the parts illustrated in Fig. 1, constitutes what may be termed one pneumatic automobile spring.

Four such springs are necessary, and are arranged at substantially the same places on the two axles used for the existing steel springs of the automobile.

In Fig. 2, 10 is an elliptically shaped and seamless chamber made of rubber in which an air-valve, 13, is seated; 11 is also an elliptically shaped and seamless outer case, made of layers of cloth fabric covered with rubber and vulcanized into one piece, compactly surrounding but not integral with said chamber, 10, and through which case said air-valve extends to the open air; the said valve being used to inflate said chamber with compressed air and being substantially the same type as the valve now employed for inflating automobile pneumatic tires; 12 is a square solid rubber lug vulcanized to, and made integral with said outer case, 11.

In Fig. 3, the balls of one ball-bearing are shown as they surround and work against the bolt, 3, the latter in cross-section; 14 shows an annular groove or collar in which the balls are contained and move as they work against the round surface of said bolt as bearings.

Said annular groove, containing the balls, is welded or by other suitable means affixed to the repspective plates 5 and 7, shown in Fig. 1. An air chamber and outer case, such as those described and illustrated in Figs. 1 and 2, when six to seven inches in length by five to six inches in width, afford a larger pneumatic surface to sustain the weight of the automobile than the ordinary pneumatic tire, since only a small fraction of the tire at any given moment sustains such weight while most of the surface of the tire merely serves the function of a pneumatic wheel in the air.

In the invention, also, only the weight over the axles is sustained by the pneumatic springs.

As the plates, air chambers and outer cases below the axles sustain simply the pressure and absorb the shocks of upward jolts and motions or those motions that are swiftly compounded of all the vibrations of the automobile, they may be constructed, when desired, of smaller dimensions, still keeping them of equal length with the plates, air chambers and outer cases above the axles.

In the automobile, under many conditions, in many climates, non-skidding chains are imperatively demanded notwithstanding that such chains lessen the resiliency of the tires.

The harder riding, so caused, does not occur in automobiles using the above-described pneumatic springs, since in the latter case the like indespensable use of chains does not produce inequalities of surface at the very points where the principles of resiliency are at work. While the invention is designed to eliminate steel springs and all types of shock absorbers, it is likewise thought that its use will displace pneumatic tires as unnecessarily costly and unsafe as compared with solid rubber or metallic tires.

The two bolts, 3 and 3, being rigidly affixed to the frame of the automobile and also to the plates 4 and 9, and being set one in front, the other behind the axle, and the plates 5 and 7 being rigidly affixed to the axle, one above, the other below it, and such plates 5 and 7 working freely up and down with the axle through said ball-bearings and grease cups, it is obvious that friction is very small and that forward, backward or sideway lurchings of the chassis are prevented, thus giving the described pneumatic springs a maximum of strength and resiliency.

The weight sustained by said air chambers and outer cases being less than that sustained by the tire for a given automobile, the air pressures for carrying capacities for each pneumatic spring is less than the air pressures for carrying capacities for each pneumatic tire per square inch of active pneumatic surface.

Moreover, the material in said air chambers and outer cases is not, as in the tire, exposed to the wear and tear of direct contact with the road; but, on the contrary, the metallic plates, smoothly polished and always presenting a uniform surface to said outer cases and lugs, these are practically free from puncture or blow-out.

The amount of rubber and fabric employed in the construction of the eight chambers and cases for the pneumatic springs of an automobile is manifestly far less than what is required for the four tires now in use.

The economy of the mechanism may, hence, be readily perceived.

Having described and illustrated my invention, I claim:

1. In a pneumatic spring of the character described and in combination, a vehicle axle, a chassis frame member, a pair of spaced vertically disposed elongated bolts fixed to the frame member and extending downwardly on opposite sides of the axle; a semi-elliptically shaped metal plate, having a square depression therein, fixed to the top of said axle; a semi-elliptically shaped metal plate, having a square elevation therein, fixed to the bottom of said axle; opposite sides of each of said plates being fixed to said bolts with collars; a pneumatic elliptically shaped bag with a square and solid rubber lug vulcanized to the bottom of said bag seated in said square depression in said plate fixed to the top of said axle; a pneumatic elliptically shaped bag with a square and solid rubber lug vulcanized to the top of said latter bag seated in said square elevation in said plate fixed to the bottom of said axle; said plates having a sliding connection around said bolts through lubricated ball-bearings set in said collars integral with and upon opposite sides of each of said plates; a semi-elliptically shaped metal plate fixed to said bolts on opposite sides of said axle and covering said bag above said axle; a semi-elliptically shaped metal plate fixed to said bolts on opposite sides of said axle and supporting said bag below said axle.

2. In a pneumatic spring of the character described and in combination, a vehicle axle, a chassis frame member, a pair of spaced vertically disposed elongated bolts fixed to the frame member and extendingly downwardly on opposite sides of the axle; a semi-elliptically shaped metal plate, one welded to the top of said axle, another welded to the bottom of said axle, opposite sides of each of said plates being fixed to said bolts; said plates having a sliding connection on said bolts; said sliding connection comprising a collar containing ball-bearings provided on opposite sides of each of said plates and through which ball-bearings said bolts pass; an elliptically shaped pneumatic bag seated in each of said plates; a solid rubber cushion incorporated in each of said seats and presented between the axle and each of said pneumatic bags; a semi-elliptically shaped metal plate covering the pneumatic bag above the axle, and a semi-elliptically shaped metal plate supporting the pneumatic bag seated below the axle.

EDWARD EVERETT COTHRAN.